United States Patent [19]

Baughman et al.

[11] 4,139,578

[45] Feb. 13, 1979

[54] BIS (ALLYL CARBONATE) COMPOSITIONS AND POLYMERIZATES THEREFROM

[75] Inventors: Glenn L. Baughman, Wadsworth; Henry C. Stevens, Akron, both of Ohio

[73] Assignee: PPG Industries, Inc., Pittsburgh, Pa.

[21] Appl. No.: 631,354

[22] Filed: Nov. 12, 1975

[51] Int. Cl.$^2$ .......................... C08L 67/06; G02B 5/30
[52] U.S. Cl. .................................... 260/871; 260/872; 351/159
[58] Field of Search .................. 260/871, 872, 873; 351/159, 166, 160–163

[56] References Cited

U.S. PATENT DOCUMENTS

| 2,443,738 | 6/1948 | Kropa | 260/869 |
|---|---|---|---|
| 2,443,739 | 6/1948 | Kropa | 260/864 |
| 2,443,740 | 6/1948 | Kropa | 260/869 |
| 2,443,741 | 6/1948 | Kropa | 260/865 |
| 2,882,256 | 4/1959 | Waychoff | 260/872 |
| 3,583,884 | 6/1971 | Baum | 260/872 |

FOREIGN PATENT DOCUMENTS 1129688  9/1966  United Kingdom ..................... 260/872

*Primary Examiner*—J. Ziegler
*Attorney, Agent, or Firm*—Irwin M. Stein

[57]  ABSTRACT

Compositions of bis (allyl carbonate) of linear or branched alkylene glycols, unsaturated polyester resin, and unsaturated monomer, e.g., unsaturated esters and styrene, and polymerizates produced from such compositions are described. A particular embodiment described is the composition comprising 40 weight percent diethylene glycol bis (allyl carbonate), 50 weight percent poly(ethylene maleate adipate) and 10 weight percent of dimethyl maleate, and polymerizates prepared from such composition. Such polymerizates have good optical properties and are useful as lenses, e.g., ophthalmic lenses.

29 Claims, No Drawings

BIS (ALLYL CARBONATE) COMPOSITIONS AND POLYMERIZATES THEREFROM

DESCRIPTION OF THE INVENTION

This invention relates to liquid compositions that are capable of being polymerized by a free radical initiator to uniform polymerized products (polymerizates). More particularly, this inventon relates to termonomeric compositions capable of yielding upon heating in the presence of free radical initiators, a cross-linked, clear, thermoset polymer having good optical properties and mechanical properties, such as abrasion resistance. Still more particularly, this invention relates to liquid polymerizable cmpositions consisting essentially of copolymerizable components, i.e., bis (allyl carbonate) of linear or branched alkylene glycols, ethylenically unsaturated polyester and unsaturated monomer, e.g., lower alkyl ester of unsaturated carboxylic acids, vinyl ester of the lower members of saturated monocarboxylic acids, and styrene.

Polymers of diethylene glycol bis (allyl carbonate) have achieved commercial significance for the production of optical lenses and flat transparent sheets. See, for example, Encyclopedia of Polymer Science and Technology, Volume 1, pages 799-803, Interscience Publishers, New York, 1964. Diethylene glycol bis (allyl carbonate) shrinks about 14 volume percent during polymerization, a substantial portion of which occurs during casting in molds. Such shrinkage imposes stresses on the casting formed in the mold due to the adherence of the casting to the mold surface. In the case of cast lenses, such stresses cause the lens casting either to lose intimate contact with the mold surface and/or cause cracking of the lens castings. The latter difficulty occurs because the partially polymerized compound lacks the strength to withstand the stresses imposed upon it during the polymerization process. As a result, damage often occurs to castings of high diopter lenses, lenses that have relatively thick sections, and lenses having abrupt changes in surface curvature, e.g., lenticular lenses.

Diethylene glycol bis (allyl carbonate) has been copolymerized with different monomers in an effort to modify its casting characteristics without, at the same time, impairing its desirable characteristics, such as its impact strength, optical properties and scratch resistance. Copolymers of diethylene glycol bis (allyl carbonate) with methyl methacrylate, vinyl acetate, triallyl cyanurate, and maleic anhydride have been proposed. See the aforementioned article in the Encyclopedia of Polymer Science and Technology. Terpolymers of diethylene glycol bis (allyl carbonate), an allyl S-triazine and a monoethylenically unsaturated monomer or unsaturated polyester have also been proposed. See, for example, British Pat. No. 1,129,688. Diethylene glycol bis (allyl carbonate) has also been described as useful as a cross-linking monomer for unsaturated polyesters. See, for example, U.S. Pat. Nos. 3,583,884, 3,632,667, 3,674,748 and 2,852,487.

It has now been discovered that liquid polymerizable compositions consisting essentially of from 30 to 55 weight percent of bis (allyl carbonate) of linear or branched alkylene glycols, from 20 to 55 weight percent of ethylenically unsaturated polyester and from 5 to 30 weight percent of unsaturated monomer (as described hereinbefore) can be polymerized to clear thermoset polymers with useful properties. Such compositions can be cast into various shapes by conventional casting techniques. Polymerizates of the preferred compositions retain substantially the desirable properties of good optics, abrasion resistance and chemical resistance characteristic of homopolymers of diethylene glycol bis (allyl carbonate). Shrinkage during polymerization for some of the polymerizable compositions described herein is less than that experienced for homopolymers of diethylene glycol bis (allyl carbonate). Consequently, the yield of castings is improved with such compositions, i.e., a smaller number of castings are damaged, fractured or cracked during polymerization or upon removal from the mold. Further, less mold damage is encountered.

DETAILED DESCRIPTION

The bis (allyl carbonate) monomers considered useful in the polymerizable composition of the above-described composition, are the bis (allyl carbonate) of linear or branched alkylene glycols, e.g., ethylene glycol, propylene glycol, trimethylene glycol, tetramethylene glycol, diethylene glycol, and triethylene glycol. These bis (allyl carbonate monomers) can be represented by the formula,

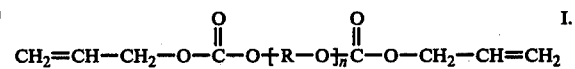

wherein R is a bivalent aliphatic moiety of from 2 to 4 carbon atoms, i.e., $C_2$-$C_4$ alkylene glycols, e.g., ethylene ($-CH_2-CH_2-$), propylene, trimethylene or tetramethylene, and $n$ is 1, 2 or 3. Of particular utility are the bis (allyl carbonate) monomers represented by the formula,

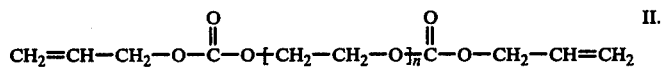

wherein $n$ is 1, 2, or 3, corresponding to the bis (allyl carbonates) of ethylene glycol, diethylene glycol and triethylene glycol respectively. For convenience and ease of reference, the aforementioned linear or branched alkylene glycols, the bivalent moiety of which is represented by the expression $+O-R-O+_n$ in formula I, will be referred to hereinafter and in the claims as alkylene glycols.

The above-described bis (allyl carbonate) monomers can be prepared by reacting the corresponding alkylene glycol bis (chloroformate) with allyl alcohol in the presence of aqueous alkali, e.g., sodium hydroxide. The esterification is carried out by adding the alkali into a reactor containing the chloroformate and allyl alcohol while the mixture is being stirred. The resulting brine and monomer are separated and the monomer dried, filtered, and vacuum stripped. The bis chloroformates of alkylene glycols can be prepared by reacting phosgene with the corresponding alkylene glycol. Diethylene glycol bis (allyl carbonate) is preferred. Diethylene glycol bis (allyl carbonate) is commercially available and is sold under the trademark, CR-39 Allyl Diglycol Carbonate, by PPG Industries, Inc.

The amount of bis (allyl carbonate) monomer used to prepare the polymerizable compositions of the present invention can vary from 30 to 55 weight percent, e.g., 35 to 50, more preferably 40 to 50, weight percent based on the total resinous composition. Mixtures of bis (allyl carbonate) monomers are also contemplated.

The ethylenically unsaturated polyester component of the polymerizable composition can be obtained by the esterification reaction of a polyhydric alcohol with an ethylenically unsaturated dicarboxylic acid optionally mixed with a saturated aliphatic dicarboxylic acid. Such polyesters and their manner of preparation from anhydrides and dicarboxylic acids are well known to persons skilled in the art. See, for example, U.S. Pat. Nos. 2,852,487, 2,441,799 and 2,632,753.

Alternatively, the ethylenically unsaturated polyester can be prepared by the alcoholysis of lower dialkyl (methyl or ethyl) esters of unsaturated dicarboxylic acids with glycols. For example, diethyl fumarate can be reacted with diethylene glycol. Any of the polyhydric alcohols, e.g., glycols; described herein with respect to the preparation of the unsaturated polyester by the esterification reaction or the alkylene glycols described with respect to the preparation of the bis (allyl carbonate) monomers, can be used in the alcoholysis reaction. Similarly, any of the unsaturated dicarboxylic acids described herein with respect to the preparation of the unsaturated polyester by the esterification reaction can be used to prepare the lower dialkyl esters reacted with the glycol. Mixtures of esters and/or glycols can be used to prepare the unsaturated polyester by alcoholysis. The molecular weight of the resulting polyester is controlled by the ratio of the reactants used in the alcoholysis reaction.

The ethylenically unsaturated polyester (prepared by esterification) most useful in forming the polymerizable compositions of the present inventions have a number average molecular weight of less than 2000, preferably from about 1,000 to about 2,000 and more preferably from about 1,000 to about 1,500. The unsaturated polyester will typically have a hydroxyl number of between 56 and 112 and an acid number of from less than 1 to about 50, preferably from about 10 to about 30.

The molecular weight of the ethylenically unsaturated polyester prepared by the alcoholysis reaction used to prepare the polymerizable compositions will vary usually between 400 and 1,000. The viscosity of the hydroxy terminated unsaturated polyester (prepared by esterification) in general is higher than that of the corresponding ester oligomer (prepared by alcoholysis).

The amount of polymerizable ethylenically unsaturated polyester used in the polymerizable composition of the present invention can vary between about 20 and 55 weight percent, more usually between 35 and 50 weight percent based on the weight of the total polymerizable composition and preferably between about 40 and about 50 weight percent.

Examples of suitable unsaturated polyesters include poly(ethylene maleate), poly(ethylene fumarate), poly(ethylene maleate adipate), poly(ethylene maleate succinate), poly(propylene maleate adipate), poly(tetramethylene maleate adipate), poly(ethylene maleate succinate adipate) and poly(ethylene maleate glutarate).

The unsaturated monomer used in the preparation of the polymerizable compositions of the present invention are liquid lower alkyl esters of unsaturated carboxylic acids, vinyl esters of the lower members of saturated monocarboxylic acids and styrene.

The lower alkyl esters of unsaturated acids are typically $C_1$-$C_4$, preferably $C_1$-$C_2$, alkyl esters of (1) unsaturated $C_1$-$C_2$ alkyl alpha substituted monocarboxylic acids and (2) unsaturated $C_4$-$C_6$ dicarboxylic acids. Examples of alkanols used to prepare such esters include methanol, ethanol, propanol, isopropanol and the butanols. Preferably, straight chain alkanols are used.

As the unsaturated dicarboxylic acid, there can be used any of the unsaturated dicarboxylic acids described herein with respect to the preparation of the unsaturated polyester component, e.g., maleic, fumaric, itaconic, citraconic, ethylmaleic, and mesaconic dicarboxylic acids. As the unsaturated alkyl alpha substituted monocarboxylic acids there can be mentioned methacrylic acid and 2-methylenebutyric acid. The methacrylic acid esters, e.g., methyl methacrylate, are economically preferred.

Vinyl esters of lower members of saturated monocarboxylic acids can also be used as the unsaturated monomer. In particular, there are contemplated the vinyl esters of $C_1$-$C_3$ saturated monocarboxylic acids, e.g., formic, acetic and propionic acids, such as vinyl acetate.

Examples of unsaturated monomers contemplated herein include: methyl methacrylate, ethyl methacrylate, butyl methacrylate, isobutyl methacrylate, dimethyl maleate, diethyl maleate, methyl ethyl maleate, dimethyl fumarate, diethyl fumarate, methyl ethyl fumarate, vinyl acetate, vinyl formate, vinyl propionate, etc. Dimethyl maleate and diethyl fumarate are preferred. Due to its high melting point and low solubility, dimethyl fumarate has limited applicability. All of the aforementioned esters can be made by the esterification reaction between the corresponding acid and alcohol by conventional esterification techniques or from the corresponding anhydride and alcohol.

The amount of unsaturated monomer used in the compositions of the present invention will vary from 5 to 30 weight percent more usually from 5 to 15, e.g., 10, weight percent based on the total weight of the polymerizable composition.

Unsaturated dicarboxylic acids used to prepare the abovedescribed unsaturated polyesters are typically the $C_4$-$C_6$ unsaturated dicarboxylic acids, such as, maleic, fumaric, itaconic, mesaconic, citraconic, ethylmaleic, mono- and dichloro maleic, mono- and dibromo maleic, glutaconic and ethylfumaric acids or anhydrides thereof. Preferably, the unsaturated dicarboxylic acids are the alpha-unsaturated, alpha-beta dicarboxylic acids or their anhydrides, such as maleic and fumaric acids, and the alkyl, e.g., methyl, ethyl, or halogenated, e.g., chloro-, bromo- derivatives thereof. Mixtures of the aforementioned unsaturated dicarboxylic acids and of the acids and anhydrides can, of course, be used in the preparation of the unsaturated polyester.

A portion of the unsaturated dicarboxylic acid used in the esterification reaction can be replaced with a saturated dicarboxylic acid, such as any linear acid in the series from oxalic acid to dodecanedioic acid, i.e., $C_2$-$C_{12}$ dicarboxylic acids. Examples of such saturated dicarboxylic acids include oxalic acid, malonic acid, succinic acid, glutaric acid, adipic acid, pimelic acid, suberic acid, azelaic acid, sebacic acid, undecanedioic acid, and dodecanedioic acid. Usually, the acids in the series from malonic to sebacic, i.e., $C_3$-$C_{10}$ dicarboxylic acids, are used. Preferably, $C_3$-$C_6$ dicarboxylic acids, i.e., malonic, succinic, glutaric and adipic acids, are used to prepare polyesters for the present polymerizable compositions. Anhydrides of any of the aforementioned saturated dicarboxylic acids, if available, can also be used. Mixtures of such acids and/or anhydrides are also contemplated.

In producing the aforementioned unsaturated polyesters with saturated and unsaturated dicarboxylic acids by the esterification reaction, the amount of saturated dicarboxylic acid used can vary over a broad range. The amount of saturated dicarboxylic acid employed however should not be sufficient to render the resulting polyester resin non-polymerizable, or, more particularly, non-copolymerizable with the other components of the polymerizable mixture of the present invention. The minimum amount of saturated dicarboxylic acid can be, of course, none at all while the maximum is generally considered to be about 9 moles of saturated dicarboxylic acid per mole of the unsaturated dicarboxylic acid. Thus, the mole ratio of saturated dicarboxylic acid to unsaturated dicarboxylic acid can vary from about 0:1 to about 9:1, more typically from about 0.1:1 to about 3:1. Most preferably, the aforesaid mole ratio will vary from about 0.1:1 to about 1:1 and more desirably about 0.67:1.

Polyhydric alcohols e.g., glycols, that can be used to produce the above-described unsaturated polyesters by the esterification reaction are aliphatic alcohols contaning two or more hydroxy groups. Typical of the polyhydric alcohols used to prepare unsaturated polyester resins are glycols containing from 2 to about 10 carbon atoms such as the polymethylene glycols in the series from ethylene glycol to decamethylene glycol. Also included are the branched alcohols such as are present in the propylene and butylene glycols. Preferably, the glycols contain from 2 to 6 carbon atoms and will be hydroxy terminated. Also useful are the polyethylene glycols in the series from diethylene glycols to triethylene glycol, and the polypropylene glycols, e.g., dipropylene glycol and tripropylene glycol. Particularly useful are diethylene and triethylene glycol. Most preferred are glycols containing from 2 to 4 carbon atoms, i.e., ethylene glycol, 1,3-propylene glycol, and 1,4-butane diol.

The preferred polymerizable unsaturated polyesters used in the polymerizable liquid compositions of the present invention are the so-called "linear polyesters," i.e., those which have little cross-linking in the polyester molecules, as evidenced by the fact that such polyesters are soluble in solvents such as acetone. Such polyesters are formed mainly by esterification condensation of a hydroxy terminated glycol and a dibasic acid. Of course, such polyesters are really only "substantially" linear since it is not possible to avoid all cross-linking at least through the unsaturated bonds in the polyester molecules. In fact, a linear or substantially linear polyester can be obtained even though in the preparation of such polyester a small proportion of the glycol, e.g., less than about 5 mole percent, is replaced by a polyhydric alcohol containing more than two hydroxyl groups, such as glycerol or pentaerythritol or a small proportion of the dibasic acid, e.g., less than about 5 mole percent, is replaced by a polybasic acid containing more than 2 carboxyl groups, such as citric acid. Care should be observed in the preparation of the polyester to avoid a polyester with excessive viscosity or a polyester having a degree of cross-linking that produces premature gellation.

In the preparation of the unsaturated polyester resin component, the amount of polyhydric alcohol plus any monohydric alcohol used is generally chosen to give apaproximate molar equivalency, or slight excess over such equivalency, based on the sum of (1) the ethylenically unsaturated dicarboxylic acid(s), (2) any saturated, dicarboxylic acid(s), and (3) any monocarboxylic acid(s) used. Usually the molar excess of hydroxyl compound over equivalency does not exceed about 10 to 20 percent and it can be lower than 10 percent. Further, if a polyester having carboxylic acid end groups is desired, the molar equivalency of hydroxyl to carboxylic acid group will be less than 1 overall. Typically, a carboxylic acid anhydride, e.g., acetic anhydride, is added to the reaction near the end of the esterification reaction to end cap the polyester with carboxylic acid groups.

The point to which the esterification reaction is carried, is simply that point at which the product has the desired properties, e.g., hydroxyl number, acid number and viscosity. The viscosity of the polyester varies directly with the average number of acid and alcohol end groups in the molecule. For example, the average number of such end groups in the molecule of a polyester can vary from about 3 to about 120. The esterification reaction is continued until water ceases to be evolved and until the acid value of a sample is reasonably low, e.g., in the range of less than 1 to 50. After the desired acid value has been reached directly or by subsequent addition of monohydric alcohol, any unreacted materials are distilled off. The resulting mass is then cooled to a safe temperature.

Whenever added during preparation of the polyester, gelation inhibitors are used in the proportion required to give the desired inhibiting effect. It may be necessary to use different inhibitors in widely different proportions in order to secure the same inhibiting effect. Any of the conventional inhibitors such as hydroquinone, pyrogallol, tannic acid, aromatic amines, e.g., phenylene diamine, tertiary butyl catechol, hydroquinone monomethyl ether, butylated hydroxy toluenes, or butylated hydroxy anisol, can be used as the inhibiting agent. Such gelation inhibitors can be added in appropirate levels at any time during the esterification.

A polymerizable unsaturated polyester can be prepared by the following procedure:

A suitable reaction flask is fitted with a stirrer, thermometer inlet tube for introducing a stream of inert gas, e.g., argon, and a distillation column consisting of a steam-heated unpacked section and a packed section, e.g., ceramic saddles or other suitable packing. Into a flask is charged 3.0 moles of maleic anhydride, 3.0 moles of adipic acid, and 6.6 moles of ethylene glycol. The batch is heated to 140° C. by means of an oil bath while an argon stream bubbles through the mixture and water, which is formed during the polycondensation, is distilled from the flask. As the polycondensation proceeds, the temperature of the molten reaction mass increases and the distillation temperature at the top of the column begins to drop. Analysis for acid number, c.f. A.S.T.M. Method D 1638, indicates the degree of reaction. When the temperature at the top of the column reaches about 60–75° C. and an acid number of 60–70 is obtained, the distillation column is replaced with a simple still head and the rate of argon bubbling through the flask increased substantially to remove excess glycol. The temperature of the reaction mass during this phase reaches about 200°–210° C. Analysis to monitor the reaction is continued until the desired degree of reaction, as indicated by the acid number and molecular weight (indicated by the viscosity of the reaction mass, e.g., Gardner-Holdt viscosity) is obtained. Such viscosities can be determined by measuring a 60 percent by weight solution of the polyester in a suitable solvent, e.g., ethyl cellosolve. Polyesters prepared from this procedure are clear, stiff liquids with acid numbers of from 17 to 20 and Gardner-Holdt viscosities in the B to E range.

The mechanical and optical properties of the compositions described herein will vary relative to homopolymers of diethylene glycol bis (allyl carbonate) with the particular polymerizable components used and the relative amount of each polymerizable component. Generally, the higher the level of unsaturated monomer the softer the polymerizate; the lower the heat distortion and modulus of the polymerizate and the greater the shrinkage experienced by the polymerizate. The higher the level of unsaturated polyester, the lower the shrinkage experienced by the polymerizate and the more viscous the polymerizable composition. The more saturated dibasic acid used in the preparation of the unsaturated polyester, the lower the heat distortion and modulus of the polymerizate. Finally, reducing the level of the unsaturated polyester and increasing the level of unsaturated monomer while maintaining about the same ratio of allylic to non-allylic double bonds in the reactants will generally reduce the refractive index and increase slightly the shrinkage of the polymerizate.

The compositions of the present invention comprise a polymerizable mixture of polymerizable ethylenically unsaturated materials. As described herein before, such composition consists essentially of from 30 to 55 weight percent of bis (allyl carbonate) of alkylene glycols, from 20 to 55 weight percent of ethylenically unsaturated polyester and from 5 to 30 weight percent of unsaturated monomer. The amount of each of the three components used should be chosen from the amounts described for each so that the total sum adds up to 100 percent. The three components of the composition should form a homogeneous single phase, i.e., the components should be mutually soluble. Preferred are three component compositions of the aforementioned ratios of diethylene glycol bis (allyl carbonate), poly(ethylene maleate adipate) and dimethyl maleate. More preferred are the aforementioned polymerizable materials in a weight proportion of about 40/50/10, respectively.

The three polymerizable components are blended to form a homogeneous mixture before being polymerized so as to produce a substantially homogeneous polymerizate while any mixing sequence can be used, it is preferred to blend warm unsaturated polyester into a mixture of the bis (allyl carbonate) and the unsaturated monomer. This procedure provides a fairly homogeneous mixture.

The compositions of the present invention can be polymerized to a clear thermoset polymer. The preferred compositions form polymerizates having optical properties and abrasion resistance suitable for use as lenses, e.g., ophthalmic lenses. The polymerizable compositions have an adequate shelf life, e.g., at least 3 months, and can be shipped as an article of commerce.

The polymerizable compositions of the present invention can contain conventional additives, e.g., stabilizers, such as hydroquinone monomethyl ether, and release agents, e.g., lubricants, to permit the ready separation of castings (polymerizates) prepared from the compositions from the sides of the casting mold. The aforementioned stabilizers, solvents, and lubricants are used in amounts sufficient to accomplish the desired results, usually in amounts less than 0.1 weight percent, basis the total weight of the composition.

The composition of the present invention can be conveniently polymerized with free-radical initiators and the application of heat to give cross-linked, thermoset clear polymerizates. The amount of free-radical initiator will vary with the reactivity of the ingredients of the composition; but, generally will vary in an amount of between about 0.1 and about 5 percent by weight, basis the polymerizable composition. More typically between about 2 and about 4 weight percent of initiator is used. Commonly used free-radical initiators are benzoyl peroxide and diisopropyl peroxydicarbonate.

The compositions of the present invention can be polymerized either in an air oven or in a water or oil bath. The time of polymerization, or cycle, is a function of the rate at which the heat of polymerization can be removed which, to a certain extent, depends upon the thickness of the material being cast or made. Since the polymerization reaction is inhibited by air, castings are normally made in a two-piece glass mold separated by a suitable, e.g., elastomeric, gasket. If a surface is exposed to the atmosphere, a carbon dioxide or nitrogen blanket can be maintained. Temperatures of polymerization will vary from about 40° C. to about 150° C. at polymerization times of from about 5 minutes to 30 hours using diisopropyl peroxydicarbonate.

In a typical embodiment, the polymerizable composition is mixed with the free-radical initiator and filtered, preferably twice, to assure its freedom from contaminating solids and particularly lint. A lubricant such as Ortholeum 162 (a lubricant assistant consisting of mono- and dialkyl phosphates sold by the E. I. du Pont de Nemours and Co.) or surface active agents such as Aerosol OT (a product of American Cyanamid Co.) is added to the mix to diminish the adhesion between the dissimilar material of the mold, usually glass, and the polymer. The mold with its polymerizable composition content is then placed in, for example, a curing oven wherein the polymerization, i.e., cross-linking and solidification, takes place. The oven is heated uniformly and homogeneously since a few degrees difference localized in one area is detrimental to the final product. In a typical example using diisopropyl peroxydicarbonate (IPP), the polymerization starts at a temperature between 40° C. and about 50° C. but not substantially above 50° C. The temperature rises slowly to about 100° C. If the mold is held at constant temperature, gelation takes place uniformly throughout the polymerizable composition. Gel is formed in about ½ hour at 45° C. with 2.5 weight percent of IPP catalyst. The temperature used determines the duration of the curing treatment. Cure can be completed within about 12 hours. Longer cures are used typically with relatively thick, e.g., ¼ inch (6.35 mm) castings. Overcuring at too high a temperature for extended time periods should be avoided since a polymerizate that is yellow results. The polymerization of diethylene glycol bis (allyl carbonate), vis a vis cure cycles, is described in detail in the article, "Polymerization Control in Casting a Thermosetting Resin," by W. R. Dial et al, Industrial and Engineering Chemistry, Vol. 47, pp 2447-51, December, 1955. The information contained in this article is applicable to the polymerization of the compositions of the present invention. The article is therefore incorporated herein by reference.

After curing, the solid-phase is removed from the mold. The polymerizate is a strong, hard insoluble infusable clear and substantially colorless solid. The polymerizates are non-yellowing. Preferred polymerizates for opthalmic lenses have a refractive index in the range, 1.4990–1.5025. The hardness, abrasion resistance, and optical properties of the preferred polymerizates are similar to homopolymers of diethylene glycol bis (allyl carbonate).

Polymerizates of preferrred embodiments of the present invention can be used in the production of optical lenses, e.g., corrective eye glass lenses, safety glasses, sunglasses, camera finder lenses, reading lenses, scale lenses, reflector lenses, binocular lenses, objective lenses, eye-piece lenses, condenser lenses, telescope lenses, and of flat transparent sheets, simple curved sheets, and compound curved sheets. Polymerizates of the present invention also can be used as lenses for firefighter's masks, plates that cover expensive ultraviolet- and infra red-absorbing glass used to protect welder's eyes, watch crystals, safety hoods, and shields, photographic filters, instrument windows, aircraft windows, and canopies, gage covers, and glazing, and electrical insulating parts.

The compositions of the present invention can be polymerized either to a clear, unpigmented state or in the presence of fillers, dyes, pigments, opacifiers, lubricants, plasticizers or other modifying agents in, for example, casting, molding and laminating applications.

In the following examples, polymerization products are physically tested for different properties by test methods described hereinafter.

PHYSICAL TESTING

1. Density — Densities of materials were determined in 10 ml. pyenometers thermostated in a water bath at 25° C. and calibrated with freshly boiled, distilled water.

2. Shrinkage — The amount of shrinkage occurring during polymerization was calculated by means of the following equation:

$$\frac{\text{polymer density} - \text{monomer density}}{\text{polymer density}} \times 100 = \% \text{ shrinkage}$$

3. Viscosity — Absolute viscosity determinations were accomplished on materials in a thermostated water bath of 25° C. with a Brookfield Model LVF viscometer. Choice of spindle and rotational speed were made to obtain mid-range readings. Readings were taken for at least two speeds and averaged to the nearest five centipoise (cps) for values greater than 100 centipoises. (cps).

4. Barcol Hardness — The property of Barcol Hardness is defined as "The hardness reading using a Barcol apparatus meter (as read on the dial gage) 15 seconds after applying the load."

5. Color —

Color was determined spectrophotometrically and the percent yellowness obtained by the following equation:

$$\frac{\text{green light transmission} - \text{blue light transmission}}{\text{green light transmission}} \times 100 = \% \text{ yellowness}$$

6. Taber abrasion — Taber abrasion is the number of revolutions of a Calibrase CS-10F wheels with 500 gram loads required to produce a 10 percent haze. Results are reported as the ratio for the sample under test relative to a Plexiglass standard.

The present process is more particularly described in the following examples which are intended as illustrative only since numerous modifications and variations therein will be apparent to those skilled in the art.

EXAMPLE I

Forty parts of diethylene glycol bis (allyl carbonate) were blended with 10 parts of dimethyl maleate and 50 parts of poly(ethylene maleate adipate) of about 1200 molecular weight. The mole ratio of maleate to adipate moieties in the polyester was 1:1. The polyester included p-methoxy phenol as a gel inhibitor to prevent premature gelation. Blending was accomplished on a Fischer-Kendall tumble-type mixer. To the aforesaid blend of polymerizable components was added 2.5 weight percent diisopropyl peroxydicarbonate and the mixture polymerized into flat sheet castings of about 3 mm thickness by a cure cycle which began at 42° C. The temperature of the blend was increased exponentially to 100° C. in 23.5 hours and then held at 100° C. for an additional 0.5 hours.

For comparison purposes, similar flat sheet castings were prepared from a homopolymer of diethylene glycol bis (allyl carbonate). The properties of the unpolymerized materials and of the sheet castings were measured and are listed in Table 1.

EXAMPLE II

The procedure of Example I was repeated except that the polymerizable composition was prepared with 33 parts of poly(ethylene maleate adipate), 47 parts of diethylene glycol bis (allyl carbonate) and 20 parts of dimethyl maleate. Further 3.0 weight percent diisopropyl peroxydicarbonate was used to initiate the polymerization. Properties of the composition and of the sheet castings are listed in Table 1.

TABLE 1

| COMPOSITION | CR-39* | EXAMPLE I | EXAMPLE II |
|---|---|---|---|
| MONOMER PROPERTIES | | | |
| Viscosity, cps, 25° C. | 17 | 485 | 100 |
| Density, g/cc. 25° C. | 1.147 | 1.208 | 1.188 |
| POLYMER PROPERTIES | | | |
| Sheet Casting | | | |
| % catalyst | 3.5 | 2.5 | 3.0 |
| Barcol, (15") | 30 | 22 | 27 |
| % Yellowness | 2.9 | 2.0 | 2.0 |
| Refractive Index, $n_D 20$ | 1.4984 | 1.4990 | 1.4964 |
| Density, g/cc, 25° C. | 1.313 | 1.333 | 1.322 |
| % shrinkage | 12.6 | 9.4 | 10.1 |
| Taber Abrasion X Plexiglass | 18 | 22 | 19 |

*CR-39 allyl diglycol carbonate, a trademark of PPG Industries, Inc. for diethylene glycol bis (allyl carbonate) - average values.

The data of Table 1 shows that polymerizates of the composition of Examples I and II compare favorably to homopolymers of diethylene glycol bis (allyl carbonate).

EXAMPLE III

The composition of Example I was used to cast finished opthalmic lenses by a commercial lens caster. The testing involved a large variety of glass lens mold configurations and included considerable variation in casting conditions such as gasket material and the use of mold release agents. The lens caster reported reasonable success in the casting of finished lenses in the range of −2.00 diopters to +2.00 diopters and good success in the casting of finished lenticulars. Such castings utilized a polyisobutylene/polyethylene blend gasket material, a 16 hour cure cycle and diisopropyl peroxydicarbonate as the peroxide initiator. The casting of higher power lens, i.e., greater than ±2.00 diopters were not as successful. Specifically, yields of finished lenses in the range ±2.25 diopters ranged from 62 to 91 percent and the yield of finished lenticular lenses ranged from 50 to 83 percent for the same test batches. The lens caster reported that the potential of the composition of Example I for casting finished lenses was clearly superior to that of diethylene glycol bis (allyl carbonate), which the lens caster reported was limited to a ±1.00 diopter range and was not suitable for casting finished lenticulars.

The data of Examples I-III show that compositions of the present invention produced polymerizates that compare favorably with that of homopolymers of CR-39 allyl diglycol carbonate and, unlike such homopolymers, have the potential for preparing cast finished ophthalmic lenses of higher diopters and finished lenticulars.

EXAMPLE IV

Polymerizable compositions of the present invention were prepared utilizing various unsaturated polyesters, diethylene glycol bis (allyl carbonate) and dimethyl maleate in several different proportions. The compositions were cast into 1/8 × 6 × 6 inches (3 mm × 152 mm × 152 mm) sheets and cured with 2.0 weight percent diisopropyl peroxydicarbonate using a 24 hour cure cycle. The polyester used and properties of the composition and cast sheet are tabulated in Table 2.

The data of Table 2 show that while the polymerizate properties of the compositions described therein differ in varying degrees from those of the homopolymer of diethylene glycol bis (allyl carbonate), overall the properties of such compositions are nearly comparable with less shrinkage. For example, composition B exhibits a slightly lower hardness, lower modulus and less shrinkage with the rest of the properties being comparable.

EXAMPLE V

Compositions C and D of Example IV were used to cast ophthalmic lenses by a commercial lens caster. The compositions were cured using 2.0 weight percent diisopropyl peroxydicarbonate and a 16 hour cure cycle in glass molds. Both compositions provided a 100 percent yield of lenses at the −2.00 diopter level, i.e., 19 out of 19 for composition C and 20 out of 20 for composition D. When used to produce −5 nominal diopter lens, composition D produced a 50 percent yield. When used to produce +4 nominal diopter lenses, composition C produced from 35 to 54 percent yields while composition D produced a 50 percent yield.

EXAMPLE VI

Dimethyl maleate, diethylene glycol bis (allyl carbonate) [CR-39], and poly(ethylene maleate adipate), the mole ratio of maleate to adipate moieties in the polyester being 1:1 (PEMA 1:1) were combined in various proportions to provide polymerizable compositions. These compositions were cured with diisopropyl peroxydicarbonate in a 24 cycle cure. The compositions and properties of castings prepared therefrom are tabulated in Table 3.

TABLE 2

| COMPOSITION (parts by wt.) | A | B | C | D | E |
|---|---|---|---|---|---|
| Polyester | 50[b] | 50[c] | 50[d] | 40[d] | 50[d] |
| CR-39[a] | 40 | 40 | 40 | 50 | 43 |
| Dimethyl maleate | 10 | 10 | 10 | 10 | 7 |
| MONOMER PROPERTIES | | | | | |
| Viscosity, cps, 25° C. | 1155 | 560 | 650 | 270 | 760 |
| Density, g/cc, 25° C. | 1.2384 | 1.2120 | 1.2156 | 1.2011 | 1.2159 |
| POLYMER PROPERTIES | | | | | |
| Sheet Casting | | | | | |
| Barcol, (15") | 31 | 25 | 30 | 32 | 31 |
| % Yellowness | 2.5 | 2.5 | 2.4 | 2.9 | 2.9 |
| Refractive Index, $n_D 20$ | 1.5006 | 1.5007 | 1.5010 | 1.5001 | 1.5025 |
| Density, g/cc, 25° C. | 1.363 | 1.340 | 1.341 | 1.337 | 1.341 |
| % Shrinkage | 9.2 | 9.6 | 9.3 | 11.2 | 9.3 |
| Taber Abrasion X Plexiglass | 25 | 23 | 29 | 20 | 27 |
| Flexural Strength, psi | 7290 | 5720 | 5440 | 7410 | 5550 |
| Modulus, $10^5$ psi | 3.0 | 2.5 | 2.6 | 3.0 | 2.9 |
| Heat Distortion, ° C/10 mils | 55 | 63 | 66 | 73 | 74 |
| Mils/130° C. | 30 | 24 | 18 | 24 | 16 |

[a]Trademark of PPG Industries, Inc. for diethylene glycol bis (allyl carbonate).
[b]Poly(ethylene maleate succinate), the mole ratio of maleate to succinate moieties in the polyester being 1:1.
[c]Poly(ethylene maleate adipate), the mole ratio of maleate to adipate moieties in the polyester being 5:4.
[d]Poly(ethylene maleate adipate), the mole ratio of maleate to adipate moieties in the polyester being 3:2.

TABLE 3

| COMPOSITION (parts by wt.) | F | G | H | I | J | K |
|---|---|---|---|---|---|---|
| Dimethyl maleate | 5 | 10 | 15 | 15 | 20 | 30 |
| CR-39 | 37 | 40 | 30 | 42 | 47 | 50 |
| PEMA 1:1 | 58 | 50 | 55 | 43 | 33 | 20 |
| MONOMER PROPERTIES | | | | | | |
| Viscosity, 25° C., cps | 1130 | 480 | 665 | 275 | 115 | 45 |
| Density, g/cc cps, 25° C. | 1.2183 | 1.2077 | 1.2140 | 1.1997 | 1.1875 | 1.1714 |
| WT. % DIISOPROPYL PEROXYDICARBONATE | 2.5 | 2.5 | 2.0 | 2.5 | 3.0 | 3.5 |
| POLYMER PROPERTIES | | | | | | |
| Barcol Hardness (15") | 19 | 21 | 10 | 24 | 27 | 28 |
| % Yellowness | 2.0 | 2.1 | 2.5 | 2.0 | 2.0 | 3.7 |
| Refractive Index, $n_D 20$ | 1.5017 | 1.5000 | 1.4996 | 1.4992 | 1.4964 | 1.4930 |
| Density, g/cc, 25° C. | 1.331 | 1.330 | 1.332 | 1.329 | 1.322 | 1.319 |

TABLE 3-continued

| COMPOSITION (parts by wt.) | F | G | H | I | J | K |
|---|---|---|---|---|---|---|
| % Shrinkage | 8.5 | 9.3 | 8.9 | 9.7 | 10.1 | 11.1 |
| Taber Abrasion × Plexiglass | 31 | 23 | 15 | 22 | 19 | 15 |
| Flexural Strength, psi | 5455 | 6335 | 4700 | 7315 | —[a] | — |
| Modulus 10$^5$ psi | 1.8 | 2.2 | 1.9 | 2.5 | — | — |
| Heat Distortion, ° C/10 mils | 50 | 52 | 46 | 53 | — | — |
| Mils/130° C. | 29 | 32 | 36 | 37 | — | — |

[a] Not measured.

The data of Table 3 show that compositions F-K provide polymerizates with properties suitable for the manufacture of clear thermoset articles.

EXAMPLE VII

Polymerizable compositions were prepared by blending 50 parts (by weight) of the poly(ethylene maleate adipate) of Example I, 40 parts of diethylene glycol bis (allyl carbonate) and 10 parts of unsaturated monomer. The properties of the compositions were determined and casting characteristics assessed by curing the compositions with 2.0 weight percent diisopropyl peroxydicarbonate in test tubes with a 24 hour cure cycle. The unsaturated monomer used, monomer properties and polymer properties measured are tabulated in Table 4.

TABLE 4

| UNSATURATED MONOMER | VINYL ACE- TATE | METHYL METH- ACRY- LATE | STY- RENE |
|---|---|---|---|
| MONOMER PROPERTIES | | | |
| Viscosity, cps, 25° C. | 215 | 275 | 305 |
| Density, g/cc, 25° C. | 1.1830 | 1.1824 | 1.1757 |
| POLYMER PROPERTIES | | | |
| Density, g/cc, 25° C. | 1.322 | 1.324 | 1.294 |
| % Shrinkage | 10.5 | 10.7 | 8.4 |
| Barcol Hardness (15") | 24 | 25 | 14 |

The data of Table 4 show that the compositions using vinyl acetate and methyl methacrylate gave polymerizates slightly harder than the polymerizate of Example I (~25 vs. 22), but with increased shrinkage during curing (~10.7 vs. 9.4). The styrene based composition was cured with less shrinkage than the composition of Example I (8.4 vs. 9.4), but with lower hardness (14 vs. 22).

Sheet castings for the vinyl acetate and methyl methacrylate compositions were prepared using the same cure procedure as the test tube castings. The properties of the sheets are tabulated in Table 5 and compared to the composition of Example I.

TABLE 5

| UNSATURATED MONOMER | VINYL ACE- TATE | METHYL METH- ACRY- LATE | DIMET- HYL MAL- EATE[a] |
|---|---|---|---|
| POLYMER PROPERTIES[b] | | | |
| Barcol Hardness (15") | 23 | 23 | 21 |
| % Yellowness | 1.7 | 2.0 | 2.1 |
| Refractive Index, $n_D20$ | 1.4985 | 1.5016 | 1.5000 |
| Density, g/cc, 25° C. | 1.322 | 1.326 | 1.330 |
| % Shrinkage | 10.5 | 10.9 | 9.3 |
| Taber Abrasion × Plexiglass | 14 | 15 | 23 |
| Flexural Strength, psi | 7740 | 7440 | 6335 |
| Modulus, 10$^5$ psi | 2.3 | 2.5 | 2.2 |
| Heat Distortion, ° C/10 mils | 47 | 46 | 52 |
| Mils/130° C. | 38 | 35 | 32 |

[a] Values reported are average of several determinations with different batches.
[b] Determined on 1/8" × 6" × 6" (3 mm × 152 mm × 152 mm) sheet.

The data of Table 5 show that the substitution of vinyl acetate or methyl methacrylate for the dimethyl maleate of Example I resulted in castings with Barcol hardness, color and flexural strength and modulus equal to or slightly greater than the castings prepared with the composition of Example I. Increased shrinkage, decreased Taber abrasion and heat distortion also resulted with such analogs to the composition of Example I.

The data of the Examples show that the properties of the compositions of the present invention will vary with the proportions and reactants used. By selecting one or more properties required for a particular application, one skilled in the art can select an appropriate composition.

Although the present process has been described with reference to specific details of certain embodiments thereof, it is not intended that such details be regarded as limitations on the scope of the invention except as to the extent that they are included in the accompanying claims.

We claim:

1. A liquid polymerizable composition consisting essentially of from about 30 to about 55 weight percent bis (allyl carbonate) of linear or branched alkylene glycols, from about 20 to about 55 weight percent ethylenically unsaturated polyester having a number average molecular weight less than 2000, said polyester being the esterification reaction product of polyhydric alcohol and a member of the group consisting essentially of unsaturated dicarboxylic acid, and saturated dicarboxylic acid and unsaturated dicarboxylic acid and from about 5 to about 30 weight percent unsaturated monomer selected from the group consisting of $C_1$-$C_4$ alkyl ester of methacrylic acid, $C_1$-$C_4$ alkyl ester of unsaturated $C_4$-$C_6$ dicarboxylic acid, and vinyl ester of $C_1$-$C_3$ saturated monocarboxylic acid.

2. The composition of claim 1 wherein the composition consists essentially of from about 40 to 50 weight percent of the bis (allyl carbonate), from 40 to 50 weight percent of the unsaturated polyester, and from 5 to 15 weight percent of unsaturated monomer.

3. The composition of claim 1 wherein the bis (allyl carbonate) is represented by the formula,

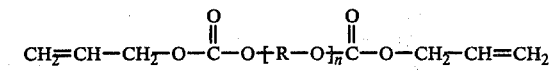

wherein R is a bivalent aliphatic moiety of from 2 to 4 carbon atoms and $n$ is 1, 2 or 3.

4. The composition of claim 3 wherein the bis (allyl carbonate) is diethylene glycol bis (allyl carbonate).

5. The composition of claim 1 wherein the unsaturated polyester is the esterification reaction product of $C_4$-$C_6$ unsaturated dicarboxylic acid and glycol containing from 2 to 10 carbon atoms.

6. The composition of claim 5 wherein $C_2$-$C_{12}$ saturated dicarboxylic acid is used in the esterification reaction and the mole ratio of saturated to unsaturated dicarboxylic acid is from 0.1:1 to 1:1.

7. The composition of claim 6 wherein the unsaturated polyester is the esterification reaction product of $C_4$ unsaturated dicarboxylic acid, glycol containing from 2 to 4 carbon atoms and $C_3$–$C_6$ saturated dicarboxylic acid.

8. The composition of claim 7 wherein the unsaturated polyester is poly(ethylene maleate adipate).

9. The composition of claim 8 wherein the ratio of adipate to maleate moieties in the polyester is about 0.67:1.

10. The composition of claim 1 wherein the unsaturated monomer is vinyl acetate, methyl methacrylate or $C_1$–$C_2$ alkyl ester of $C_4$ unsaturated dicarboxylic acid.

11. The composition of claim 10 wherein the unsaturated monomer is dimethyl maleate.

12. A liquid polymerizable composition consisting essentially of from about 35 to 50 weight percent diethylene glycol bis (allyl carbonate), from about 35 to 50 weight percent ethylenically unsaturated polyester having a number average molecular weight from about 1,000 to 2,000, said polyester being the esterification reaction product of $C_4$ unsaturated dicarboxylic acid, glycol containing from 2 to 4 carbon atoms and $C_3$—$C_6$ saturated dicarboxylic acid, the mole ratio of saturated to unsaturated dicarboxylic acid being from 0.1:1 to 1:1, and from about 5 to 15 weight percent of $C_1$–$C_2$ alkyl ester of $C_4$ unsaturated dicarboxylic acid.

13. The composition of claim 12 wherein the polyester is poly(ethylene maleate adipate) and the ester is dimethyl maleate.

14. The thermoset polymerizate prepared from the composition of claim 1.

15. The clear, cross-linked polymerizate prepared from the composition of claim 12.

16. A clear, cross-linked article of manufacture produced by polymerizing with free-radical initiator a homogeneous blend of from 30 to 55 weight percent diethylene glycol bis (allyl carbonate), from about 20 to 55 weight percent ethylenically unsaturated polyester having a number average molecular weight from about 1,000 to about 1,5000, said polyester being the esterification product of $C_4$ unsaturated dicarboxylic acid, glycol containing from 2 to 4 carbon atoms, and $C_3$–$C_6$ saturated dicarboxylic acid, the mole ratio of saturated to unsaturated dicarboxylic acid being from about 0.1:1 to 3:1, and from about 5 to 30 weight percent of $C_1$–$C_2$ alkyl ester of $C_4$ unsaturated dicarboxylic acid.

17. The article of claim 16 wherein the glycol is ethylene glycol.

18. The article of claim 17 wherein the polyester is poly(ethylene maleate adipate), the mole ratio of saturated to unsaturated dicarboxylic acid is 0.1:1 to 1:1 and the ester is dimethyl maleate.

19. An ophthalmic lens produced from the composition of claim 12.

20. An ophthalmic lens produced from the composition of claim 13.

21. An ophthalmic lens produced from the composition of claim 13 wherein the mole ratio of adipate to maleate moieties in the polyester is about 0.67:1.

22. The ophthalmic lens of claim 21 wherein the number average molecular weight of the polyester is about 1200.

23. An ophthalmic lens produced by curing a homogeneous blend of from about 40 to 50 weight percent diethylene glycol bis (allyl carbonate), from about 40 to 50 weight percent ethylenically unsaturated polyester having a number average molecular weight from about 1,000 to 1,500, said polyester being the esterificationm product of $C_4$ unsaturated dicarboxylic acid, glycol containing from 2 to 4 carbon atoms and $C_3$–$C_6$ saturated dicarboxylic acid, the mole ratio of saturated to unsaturated dicarboxylic acid being from about 0.1:1 to 1:1, and from about 5 to 15 weight percent $C_1$–$C_2$ alkyl ester of $C_4$ unsaturated dicarboxylic acid.

24. The ophthalmic lens of claim 23 wherein the polyester is poly(ethylene maleate adipate) and the ester is dimethyl maleate.

25. The ophthalmic lens of claim 24 wherein the mole ratio of adipate to maleate moieties in the polyester is about 0.67:1, the molecular weight of the polyester is about 1,200 and about 10 weight percent of dimethyl maleate is used.

26. A liquid polymerizable composition consisting essentially of from about 30 to about 55 weight percent bis(allyl carbonate) of linear or branched alkylene glycols, from about 20 to about 55 weight percent ethylenically unsaturated polyester having a number average molecular weight from 400 and 1000, said polyester being the alcoholysis reaction product of polyhydric alcohol and $C_1$–$C_2$ dialkyl ester of $C_4$–$C_6$ unsaturated dicarboxylic acid, and from about 5 to about 30 weight percent unsaturated monomer selected from the group consisting of $C_1$–$C_4$ alkyl ester of methacrylic acid, $C_1$–$C_4$ alkyl ester of unsaturated $C_4$–$C_6$ dicarboxylic acid, and vinyl ester of $C_1$–$C_3$ saturated monocarboxylic acid.

27. The composition of claim 26 wherein the bis(allyl carbonate) is diethylene glycol bis(allyl carbonate), the unsaturated polyester is the alcoholysis reaction product of diethylene glycol and dimethyl maleate or diethyl fumarate and the unsaturated monomer is vinyl acetate, methyl methacrylate of $C_1$–$C_2$ alkyl ester of $C_4$ unsaturated dicarboxylic acid.

28. A thermostat polymerizate prepared from the composition of claim 26.

29. A thermostat polymerizate prepared from the composition of claim 27.

* * * * *

UNITED STATES PATENT AND TRADEMARK OFFICE
CERTIFICATE OF CORRECTION

PATENT NO. : 4,139,578

DATED : February 13, 1979

INVENTOR(S) : Glenn L. Baughman and Henry C. Stevens

It is certified that error appears in the above-identified patent and that said Letters Patent are hereby corrected as shown below:

Column 15, line 8, after "wherein the" add --mole--

Column 15, line 41, the number shown as "1,5000" should read --1,500--.

Signed and Sealed this

Fifth Day of June 1979

[SEAL]

Attest:

RUTH C. MASON
*Attesting Officer*

DONALD W. BANNER
*Commissioner of Patents and Trademarks*